June 22, 1926.
S. S. MATTHES
CONDUCTOR SUPPORT
Filed Dec. 6, 1924
1,589,612
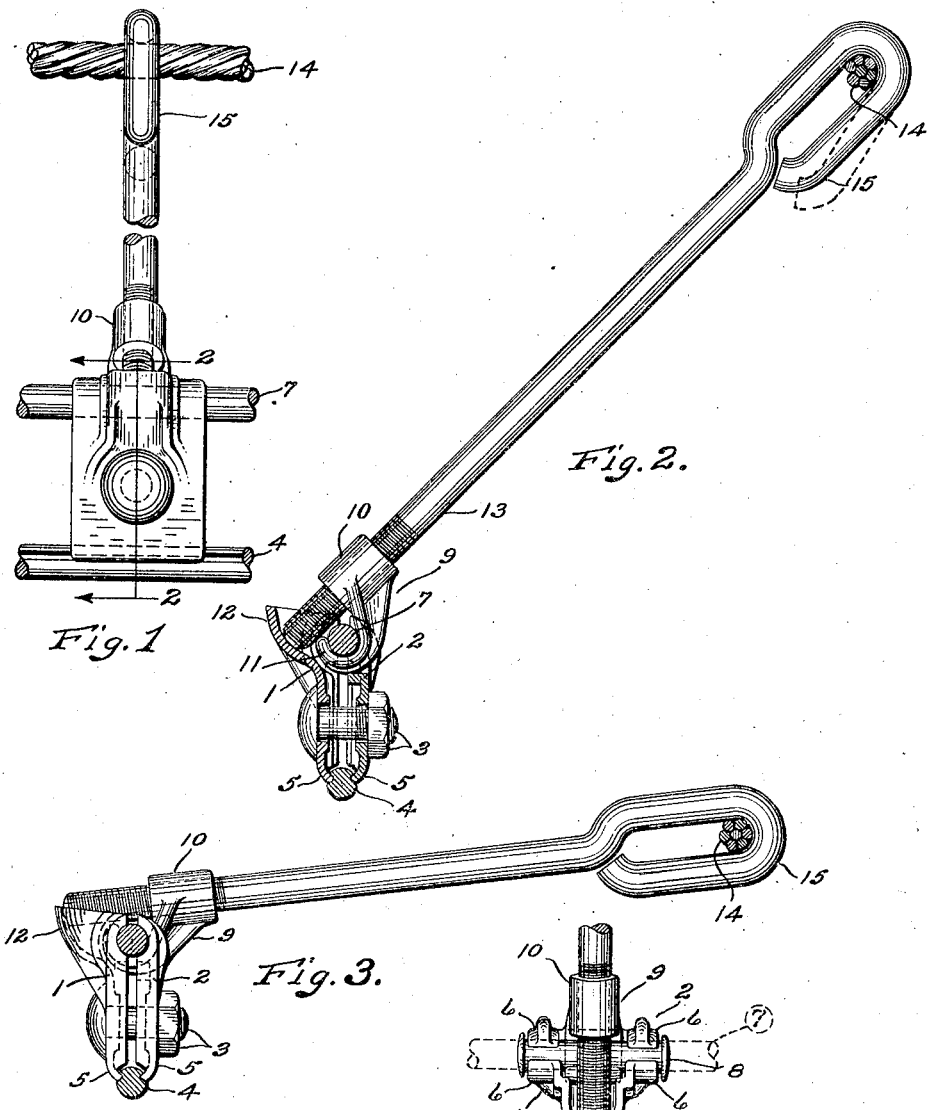

Patented June 22, 1926.

1,589,612

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed December 6, 1924. Serial No. 754,355.

My invention relates to supporting devices for trolley conductors and is particularly adapted for supporting the conductors from a messenger or catenary cable in which the conductors are freely suspended by hangers from such cable. In a catenary construction, a very flexible system is provided as the trolley wire or wires are suspended from a messenger cable which assumes a catenary curve. If this same type of construction is carried out upon curves, the tendency will be for the messenger cable to assume a substantially straight line between its supports with a catenary dip, while the tendency for the trolley wire or wires will be to swing away from or to one side of the messenger cable.

If the same hanger is used to suspend the trolley wire or wires from the messenger cable on curves as is used on straight line construction, then it will be quite evident that the hangers will be angularly disposed to the vertical due to the trolley wire attempting to assume its resultant position due to its lateral and vertical strains therein and the trolley wire will be twisted. It is not desirable to have the clamp portion of the hanger, which grips the trolley wire, to assume anything but a vertical relation with respect to the trolley wire, as otherwise, it is liable to interfere with the free movement of the current collector, therefore, I have provided a device in which the trolley wire or wires may be suspended from below and to one side of the messenger cable, as on curves, and the clamping portion of the hanger maintained in a vertical position. I have also provided a device in which that portion which connects the clamping portion with the messenger wire may be adjusted with respect to the clamping portion so as to vary the angle which the portion connecting the clamps with the messenger wire will assume to the vertical. By having these parts adjustable, it is possible for the trolley wire or wires to assume their resultant position and the jaws engaging the trolley wire or wires maintained in a vertical position, and this is quite important if two trolley wires are used, one above the other in parallel relation. There is always a tendency for the trolley wire to lift due to the upward pressure of the current collector as it moves along and, therefore, with my proposed device, the clamping jaws are pivotally mounted upon the member connecting them with the messenger cable so that the clamping portion will pivot upon its connecting member with the messenger cable sufficiently to permit the trolley wire to lift more freely with the movement of the current collector.

My invention resides in the new and novel construction, combination and arrangement of the various parts hereinafter disclosed and claimed and as shown in the accompanying drawing.

In the drawing:

Fig. 1 is a side view of my invention showing two parallel conductors suspended from a messenger cable.

Fig. 2 is a side view of my invention, as shown in Fig. 1, with the conductor clamping members shown in section on the line 2—2 of Fig. 1.

Fig. 3 is a side view of the device shown in Fig. 1, but with the connecting portion shown at a different angle from that in Fig. 2.

Fig. 4 is a top view mainly of the clamping portion shown in Fig. 1, but varying therefrom only in the substitution of a pin for the upper conductor, as herein later explained.

It is not uncommon to employ either two trolley wires or conductors in spaced parallel relation to each other and in a vertical plane, or to employ one wire, therefore, I have so constructed my device that it can with very slight modification be made adaptable to either one conductor or two conductors, and this is brought about by merely substituting for the upper wire, shown in Fig. 1, a short length of wire which may have its end upset when the device is intended for use with a single conductor as shown in Fig. 4. This short length of wire may be classed as a hinge or pin.

In my preferred construction, I employ a clamping member 1 and a clamping member 2, each provided with registering transverse holes to receive the bolt and nut 3 for securing the clamping members in position upon the trolley wire 4 or wires 4 and 7. The lower edges of the clamping members are provided with jaws 5 to engage the trolley wire 4. The upper edges of the clamping members are each provided with spaced lugs 6 provided with a groove upon their inner face which register to form a longitudinal recess for the trolley wire 7 or the pin 8. When the clamping members are in position upon the trolley wires 4 and 7 or upon the trolley wire 4 and pin 8, and the clamping bolt and nut 3 drawn up, the clamping members will grip the two trolley wires or the one trolley wire 4 and the pin 8. Positioned upon the trolley wire 7 or the pin 8 is a yoke member 9 provided with a boss 10 having a threaded orifice therethrough and a hook shaped portion 11, the latter engaging the trolley wire 7 or pin 8 and adapted to pivot upon the trolley wire or pin in a vertical plane. The member 9 is free to pivot on the member 7 or 8 and between the spaced lugs 6—6 on the clamping member 2. The clamping member 1 is shown as provided with a semi-cup-shaped projecting member 12 which projects outwardly and from between the spaced lugs 6—6 on the clamping member 1. The inner surface of the member 12 is curved, but the center of curvature is not the center of the wire 7 or the pin 8, but I prefer to place the center of the inner surface at some point on a vertical line passing through the centers of the wires 4 and 7 and above the wire 7, the idea being to form a wedging or cam action between the end of the connecting rod 13 and the inner surface of the member 12 when the parts, after adjustment, tend to move out of adjustment due to a side pull on the trolley wire 4 in the direction of the arrow as shown in Fig. 2. It is quite evident that if such a wedging action does not take place, that there would be a tendency for the clamping members to swing about the center of the wire 7 and the contact of the end of the rod 13 with the inner surface of the member 12 would not maintain the clamping members in a vertical position. Other means for holding the parts in a predetermined position may also be employed which will fall within the scope of my invention.

The clamping members are secured to the messenger cable 14 by means of the connecting member 13, to the outer end of which is secured an attaching member 15, which I have shown as a loop formed up out of the end of the rod 13 and which before attachment to the messenger cable is an open hook, as shown by the dotted line, but after attachment to the messenger cable, is formed to produce a closed hook. Such a construction is easy to produce, simple, easy to attach to the messenger cable and when in position will prevent the rotation of the connecting member 13. The lower end of the connecting member 13 is threaded to engage with the threads in the passage formed through the member 10.

To install my invention, the clamping members and yoke member 9 are positioned upon the trolley wires 4 and 7, or the wire 4, as shown, but with the end of the rod 13 out of engagement with the member 12 and the bolt and nut 3 drawn up to cause the clamping members to engage and grip the trolley wires 4 and 7 or the parts 4 and 8. The rod 13 is then rotated until its lower end engages with the member 12 at a point which is believed to give the proper adjustment and the loop member 15 is then hooked over the messenger cable. If, upon releasing the trolley wire or wires and connecting device so that they assume their normal position, the clamping members assume a vertical position then the adjustment has been properly made and the end of the hook portion 15 may be bent down into position. If, however, the clamping members do not assume a vertical position, or such other position as may be desired, then the device is unhooked from the messenger cable and a readjustment made to change the relation of the rod 13 with respect to the jaws as required.

Any tendency of lateral strain in the trolley wire 7 in the direction of the arrow in Fig. 2 will not tend to change the angular position of the rod 13 with respect to the clamping members 1 and 2, to any great extent, but a lateral strain in the trolley wire 4 will have quite a tendency to change the said angular position, therefore, as already stated, I form the inner surface of the member 12 such that any tendency for the lower trolley wire 4 to move sideways about the axis of the trolley wire 7 will only serve to increase the wedging action between the member 12 and the end of the rod 13, and by properly relating the parts, this wedging action may be made to increase quite rapidly. The pivotal action of the clamping members upon the rod 13 due to the passage of a current collector in engagement with the trolley wire 4, will not be sufficient to relieve the pressure between the rod 13 and the member 12 to an extent which will permit the wedging action between the rod 13 and the member 12 to be decreased to such an extent that the clamping jaws will pivot about the trolley wire 7 or the pin 8.

It will be quite apparent to those skilled in the art that having a device in which the connecting rod 13 is angularly adjustable with respect to the clamping jaws is an advantage as it will permit adjusting the angle of this rod at different points around a curve, so that the clamping jaws may be maintained in a substantially vertical or other position.

While I have described my invention as especially adaptable to freely supporting one or more trolley wires from a messenger cable, it will be quite apparent that the invention can be used for attachment to other forms of support, as for instance, a side pole or an overhead cross-span or an overhead bracket.

As already explained, if it is desired to use the invention with a single trolley wire 4, then it is only necessary to substitute for the trolley wire 7 in Fig. 1 a pin 8, as shown in Fig. 4, and provide means for maintaining the pin against displacement lengthwise. The clamping jaws and the yoke member 9 are indepenently movable relatively to each other about the longitudinal axis of the trolley wire 7 or the pin 8 and the connecting rod 13 is angularly adjustable with respect to the vertical plane of the clamping members and it will be noted that in the case of two wires the side pull is taken up in one of the wires.

Modifications undoubtedly will suggest themselves to those skilled in the art, which will fall within the scope of my invention, therefore, I do not wish to be limited otherwise than by my claims.

I claim:

1. A supporting device for a trolley wire comprising a pair of clamping members with means to grip the trolley wire, a pviotally mounted means to move relative to the clamping members, means to unite the members and pivotally mounted means in pivotal relation, a connecting member secured to the pivotally mounted means in longitudinally adjustable relation thereto and provided with means to secure the device to a support and means on one of the clamping members to be engaged by the connecting member to hold the parts in adjusted relation.

2. A supporting device for a trolley wire comprising clamping means to engage and clamp the wire, connecting means pivotally mounted with respect to the clamping means to secure the clamping means to a support, means secured to the connecting means to secure the clamping and connecting means together in adjustable pivotal relation and means on the connecting means to engage the clamping means after the clamping means is positioned on the trolley wire to maintain the connecting and clamping means in adjusted relation.

3. The combination of a trolley wire, a hinge member, a pair of clamping members, means thereon to grip the trolley wire at one edge and the hinge member along the opposite edge, means to hold the clamping members in engagement with the wire and the hinge member, a connecting member secured to the hinge member in pivotal relation to the clamping members and the hinge member and having means at one end of attachment to a support and means at the other end to maintain an adjusted relation between the connecting member and the clamping members.

4. The combination of clamping means to engage and grip a trolley wire, a connecting member having means at one end to connect to a support, means to secure the connecting member to the clamping means in rotatable and adjustable pivotal relation and means on the clamping means to engage with the connecting member to hold the connecting member and the clamping means in adjusted relation.

5. An overhead system comprising a catenary cable, a conductor positioned below and to one side of the cable, clamping means to engage and grip the conductor, a connecting member having one end secured to the cable and means to pivotally and rotatably secure the other end to the clamping member and permit the adjustment of the connecting member without disturbing the clamping means and means to hold the connecting member and the clamping means in adjusted relation.

6. The combination of a clamping means to grip a plurality of conductors and maintain them in fixed relation to each other, a connecting member having means to engage a support, means to secure the connecting member to one of the conductors and means on the clamping means to engage the connecting member to maintain the clamping means and connecting member in adjusted relation.

7. The combination of a clamping means to grip a plurality of conductors and maintain them in fixed relation to each other, a connecting member having means to engage a support, means to secure the connecting member to one of the conductors in pivotal relation thereto and means on the clamping means to engage the connecting member to maintain the clamping means and connecting member in adjusted relation.

8. The combination of a clamping means to grip a plurality of conductors and maintain them in fixed relation to each other, a connecting member having means to engage a support, means to secure the connecting member to one of the conductors and means on the clamping means cooperating with means on the clamping member to maintain the clamping means and connecting member in adjusted relation.

9. A support for two conductors comprising a clamping means for the conductors to maintain them in fixed relation, means to suspend the conductors below and to one side of a messenger cable and pivotally secured to one of the conductors and means on the clamping means coacting with means on the clamping member to hold the connecting member and the clamping means in adjusted relation with the axis of the conductors resting in a substantially vertical plane.

10. A conductor support comprising clamping means to engage the conductor, a connecting member having means to secure the member to a support, means to secure the connecting member to the clamping means in adjustable pivotal relation and means preventing the pivotal action in one direction only in increasing amount as the tendency to pivot increases.

11. A conductor support comprising clamping means to engage the conductor, a connecting member having means to secure the member to a support, means to secure the member in pivotal relation to the clamping means and means to produce a wedging action between the means and member to prevent said pivotal action.

12. The combination of a pair of clamping members adapted to grip a trolley wire and a hinged member therebetween and in spaced relation, means engaging the clamping members between the wire and hinged member to hold the clamping members in engagement with the wire and hinged member, means secured to the hinged member in adjustable relation thereto and engaging one of the clamping members to hold the clamping members and the hinge member in adjusted relation and to secure the device to a support.

In testimony whereof I affix my signature.

SAMUEL S. MATTHES.